United States Patent
Ciabattoni et al.

(10) Patent No.: US 10,372,018 B2
(45) Date of Patent: Aug. 6, 2019

(54) IMAGER WITH LENS FOCUSING UNIT

(71) Applicant: Datalogic USA, Inc., Eugene, OR (US)

(72) Inventors: Stefano Ciabattoni, Bologna (IT); Alana Giangrasso, Harleysville, PA (US); Thomas J. Brobst, Allentown, PA (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 15/483,729

(22) Filed: Apr. 10, 2017

(65) Prior Publication Data
US 2018/0292730 A1    Oct. 11, 2018

(51) Int. Cl.
| | |
|---|---|
| G03B 7/00 | (2014.01) |
| H04N 5/225 | (2006.01) |
| G02B 27/00 | (2006.01) |
| G06K 7/10 | (2006.01) |
| G03B 17/14 | (2006.01) |
| G02B 7/04 | (2006.01) |
| G03B 13/34 | (2006.01) |
| G03B 15/03 | (2006.01) |
| G03B 17/08 | (2006.01) |

(52) U.S. Cl.
CPC ............... G03B 7/00 (2013.01); G02B 7/04 (2013.01); G02B 27/0006 (2013.01); G03B 13/34 (2013.01); G03B 15/03 (2013.01); G03B 17/08 (2013.01); G03B 17/14 (2013.01); G06K 7/10811 (2013.01); H04N 5/2254 (2013.01); H04N 5/2256 (2013.01)

(58) Field of Classification Search
CPC ........ G03B 7/00; G03B 17/14; H04N 5/2254; H04N 5/2256; G02B 27/0006; G06K 7/10811
See application file for complete search history.

(56) References Cited

U.S. PATENT DOCUMENTS

| | | | |
|---|---|---|---|
| 5,070,348 A | 12/1991 | Hayakawa et al. | |
| 5,822,622 A | 10/1998 | Inoue | |
| 7,426,339 B2 | 9/2008 | Takanashi | |
| 2003/0029917 A1* | 2/2003 | Hennick | ............ G06K 7/10732 235/454 |
| 2006/0177206 A1* | 8/2006 | Takanashi | .............. G03B 17/08 396/27 |

FOREIGN PATENT DOCUMENTS

CN          1782854 A     6/2006

* cited by examiner

Primary Examiner — Ahmed A Berhan
(74) Attorney, Agent, or Firm — Cozen O'Connor

(57) ABSTRACT

Systems and methods for adjusting one or more settings, such as the focus and/or aperture settings, for the lenses enclosed within the imager. The imager may include a base, one or more arms, a lens assembly, and a light source assembly. The lens assembly may be clamped between the base and the light source assembly such that the components within the lens assembly are hermetically sealed and thus protected against intrusion from water and/or air borne particles. The imager may include one or more components to change the settings for the enclosed lenses. The components may include an internal ring that may be used to manipulate the lens, where the internal ring is coupled to an external ring that is accessible to a user. The components may include a motor that controls one or more gears that are coupled to the internal ring that is used to manipulate the lens.

20 Claims, 11 Drawing Sheets

IMAGER WITH LENS FOCUSING UNIT

TECHNICAL FIELD

The present disclosure relates to an imager that includes a lens assembly that is clamped between a base and a light source assembly to form a protective hermetical seal therebetween.

BACKGROUND

Description of the Related Art

Imagers that contain one or more lenses may be incorporated along various points of industrial and manufacturing processes and lines, for example, to keep track of supplies and inventories, or to monitor the operation of various tools or machines. In such situations, the settings on such imagers may need to be set and the imager focused upon setup. Moreover, the imager may need to be periodically re-calibrated and re-focused during operation. Further, such imagers may be subjected to constant, and at times severe, vibrations or jarring movements.

BRIEF SUMMARY

Imagers may include a hermetical seal to protect the components of the imager from intrusion by water and/or airborne particles or other contaminates. The imagers may include components that enable a user or operator to adjust one or more settings, such as the focus and/or aperture settings, for the lenses contained within the imager.

An imager may be summarized as including a base having a front; a lens assembly that comprises an outer lens barrel and at least one lens, the outer lens barrel having a passage, a first end, and a second end, the second end opposed across a length of the outer lens barrel from the first end, the passage extends between the first and the second ends, and the at least one lens mounted in the outer lens barrel aligned with the passage; at least one arm that extends forwardly from the base; at least one signal path that extends along the at least one arm; a light source assembly that comprises an array of light sources and an aperture therethrough, the light source assembly positioned outwardly of the first end of the outer lens barrel with the aperture aligned with the passage of the outer lens barrel, physically coupled to the at least one arm to thereby clamp the outer lens barrel between the base and the light source assembly and communicatively coupled to the at least one signal path when the outer lens barrel is clamped; and an array of photosensors having a field-of-view that extends outwardly of the front of the base, through the passage of the outer lens barrel and the aperture of the light source assembly when the outer lens barrel is clamped to the base.

The imager may further include a first resilient seal, the first resilient seal positioned between the first end of the outer lens barrel and the light source assembly to form a hermetical seal therebetween when the outer lens barrel is clamped between the light house assembly and the base; a second resilient seal, the second resilient seal positioned between the second end of the outer lens barrel and the base to form a hermetical seal therebetween when the outer lens barrel is clamped between the light house assembly and the base. The base may have a front wall and a back wall that at least partially form an interior portion of the base, the base including an aperture located on the front wall, the aperture aligned with the passage in the lens assembly when the outer lens barrel is clamped between the based and the light source assembly. The upper arm may include a concave lower surface, and a lower arm that extends outward from the front wall of the base, the lower arm including a concave upper surface located opposite the concave lower surface of the upper arm separated by a distance to form a cavity, and the outer lens barrel may be positioned within the cavity when the outer lens barrel is clamped between the base and the light source assembly.

The lens assembly may further include an internal aperture ring to vary an aperture setting on the at least one lens, and an internal focus ring to vary a focus setting on the at least one lens.

The outer lens barrel may include a first slot and a second slot and the imager may further include an external aperture ring positioned over an exterior surface of the outer lens barrel opposite the internal aperture ring, the external aperture ring physically coupled to the internal aperture ring via a first projection that passes through the first slot, a first blocking ring attached to the exterior surface of the outer lens barrel adjacent the external aperture ring, the first blocking ring to rotate radially around the exterior surface of the outer lens barrel from an open position that allows movement of the external aperture ring to vary the aperture setting of the at least one lens to a closed position that locks the exterior aperture ring, an external focus ring positioned over the exterior surface of the outer lens barrel opposite the internal focus ring, the external focus ring physically coupled to the internal focus ring via a second projection that passes through the second slot, and a second blocking ring attached the exterior surface of the outer lens barrel adjacent the external focus ring, the second blocking ring to rotate radially around the exterior surface of the outer lens barrel from an open position that allows movement of the external focus ring to vary the focus setting of the at least one lens to a closed position that locks the external focus ring.

The first blocking ring may include a first lateral portion that extends towards the external aperture ring and is separated from the outer lens barrel to form a first gap, and the second blocking ring may include a second lateral portion that extends towards the external focus ring and is separated from the outer lens barrel to form a second gap and the imager may further include a first locking ring positioned within the first gap between the outer lens barrel and the external aperture ring, the first locking ring to include a first flange that extends radially outward from the outer lens barrel between the first blocking ring and the external aperture ring, the first flange to lock a setting of the external aperture ring when the first blocking ring is in the closed position, and a second locking ring positioned within the second gap between the outer lens barrel and the external focus ring, the second locking ring to include a second flange that extends radially outward from the outer lens barrel between the second blocking ring and the exterior focus ring, the second flange to lock a setting of the external focus ring when the second blocking ring is in the closed position. At least one of the first projection and the second projection may be a screw that physically couples to a set of teeth that project radially outward from at least one of the internal aperture ring and the internal focus ring. The outer lens barrel may include one or more markings that correspond to one or more focus or aperture settings. The upper arm may include a concave lower surface, and a lower arm that extends outward from the front wall of the base, the lower arm including a concave upper surface located opposite the concave lower surface of the upper arm separated by a distance to form a cavity, the outer lens barrel may be positioned within the cavity when the outer lens barrel is clamped between the base and the light source assembly, and the distance between the upper arm and the lower arm may be sufficient to enable a user to manipulate each of the first blocking ring, the external aperture ring, the external focus ring, and the second blocking ring without decoupling the lens assembly from the base.

The outer lens barrel may include an interior surface and the imager may further include an aperture modular drive unit positioned between the internal surface of the outer lens barrel and the internal aperture ring, the aperture modular drive unit including a motor and one or more gears, at least one of which gears physically engages the internal aperture ring to vary the aperture setting. The aperture modular drive unit may have expansion slot that may extend through the aperture modular drive unit from the first side to the second side, and may form a cavity facing the first side of the aperture modular drive unit, a deformable wedge that may extend into the cavity on the first side of the aperture modular drive unit, and a projection that may be physically coupled to the deformable wedge and may extend from the second side of the aperture modular drive unit into the expansion slot, the projection to variably position the deformable wedge within the cavity to thereby control an expansion of the exterior circumference of the aperture modular drive unit. The projection may be a screw with screw threads, and the screw may be physically coupled to the deformable wedge via the screw threads to variably position the deformable wedge within the cavity of the expansion slot in the aperture modular drive unit.

The imager may further include a focus modular drive unit positioned between the outer lens barrel and the internal focus ring, the focus modular drive unit including a motor and one or more gears, at least one of which gears physically engages the focus ring to vary the focus setting.

The focus modular drive unit may have a first side and an opposing second side that extend partially radially inward from the interior surface of the outer lens barrel, the focus modular drive unit may further have an exterior circumference and the focus modular drive unit may further include an expansion slot that extends through the focus modular drive unit from the first side to the second side, and forms a cavity facing the first side of the focus modular drive unit, a deformable wedge that extends into the cavity on the first side of the focus modular drive unit, and a projection that is physically coupled to the deformable wedge and extends from the second side of the focus modular drive unit into the expansion slot, the projection to variably position the deformable wedge within the cavity to thereby control an expansion of the exterior circumference of the focus modular drive unit. The projection may be a screw with screw threads, and the screw may be physically coupled to the deformable wedge via the screw threads to variably position the deformable wedge within the cavity of the expansion slot in the focus modular drive unit.

A method for modifying a focus setting and an aperture setting on an imager, the imager including a lens and further includes a first blocking ring and an adjacent external focus ring that selectively couple to form a hermetic seal therebetween when the first blocking ring is in a locked position, and a second blocking ring and an adjacent external aperture ring that selectively couple to form a hermetic seal therebetween when the second blocking ring is in a locked position, wherein the external focus ring adjusts the focus setting for the lens and the external aperture ring adjusts the aperture setting for the lens, may be summarized as including rotating the first blocking ring in a first direction to an unlocked position, rotating the external focus ring to adjust the focus setting for the lens, rotating the first blocking ring in a second direction to a locked position, rotating the second blocking ring in a first direction to an unlocked position, rotating the external aperture ring to adjust the aperture setting for the lens, and rotating the second blocking ring in a second direction to a locked position.

A method for positioning and locking a modular drive unit to be physically coupled to one of an internal focus ring and an internal aperture ring contained within an interior of an outer lens barrel that is cylindrical in shape with a central axis, the modular drive unit being annular in shape with a first side, a second side, an outer circumference, and a coupling component, the modular drive unit further including an expansion slot that extends from the first side to the second side and forms a cavity facing the first side of the modular drive unit, a deformable wedge that extends into the cavity on the first side of the modular drive unit, and a projection that extends from the second side of the modular drive unit and is physically coupled to the deformable wedge, may be summarized as including inserting the modular drive unit into the interior of the outer lens barrel such that a plane formed by the first side is perpendicular to the central axis of the outer lens barrel until the coupling component of the modular drive unit is aligned to be physically coupled with at least one of the internal focus ring or the internal aperture ring, and rotating the projection to thereby draw the deformable wedge into the cavity and expand the outer circumference of the modular drive unit until the outer circumference of the modular drive unit is physically engaged with the interior of the outer lens barrel.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with imagers, and/or machine-readable symbol readers have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
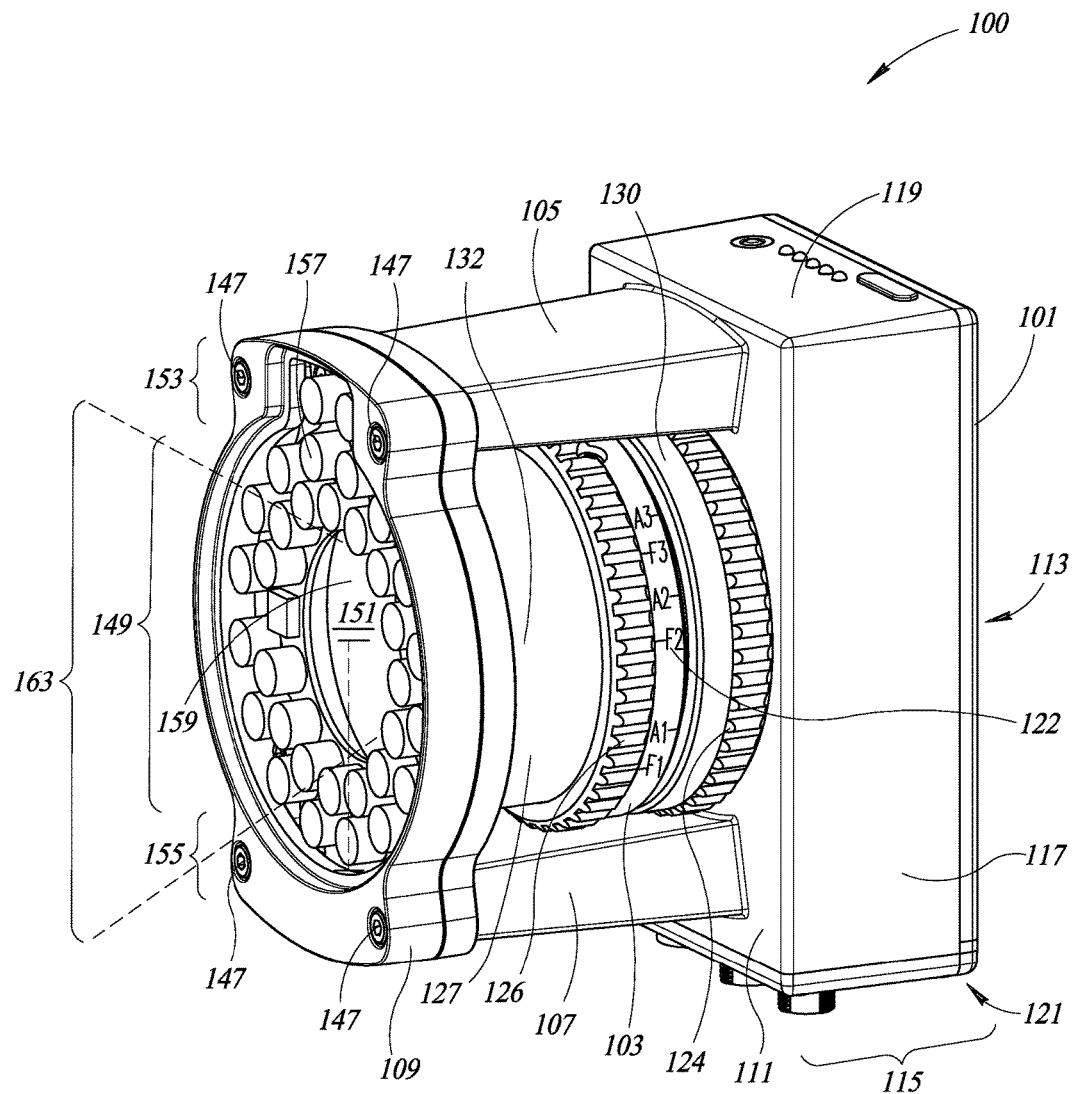
FIG. 1 is an isometric side view of an imager with a lens housing clamped between a light assembly and a base, according to at least one illustrated implementation.
Figure 2:
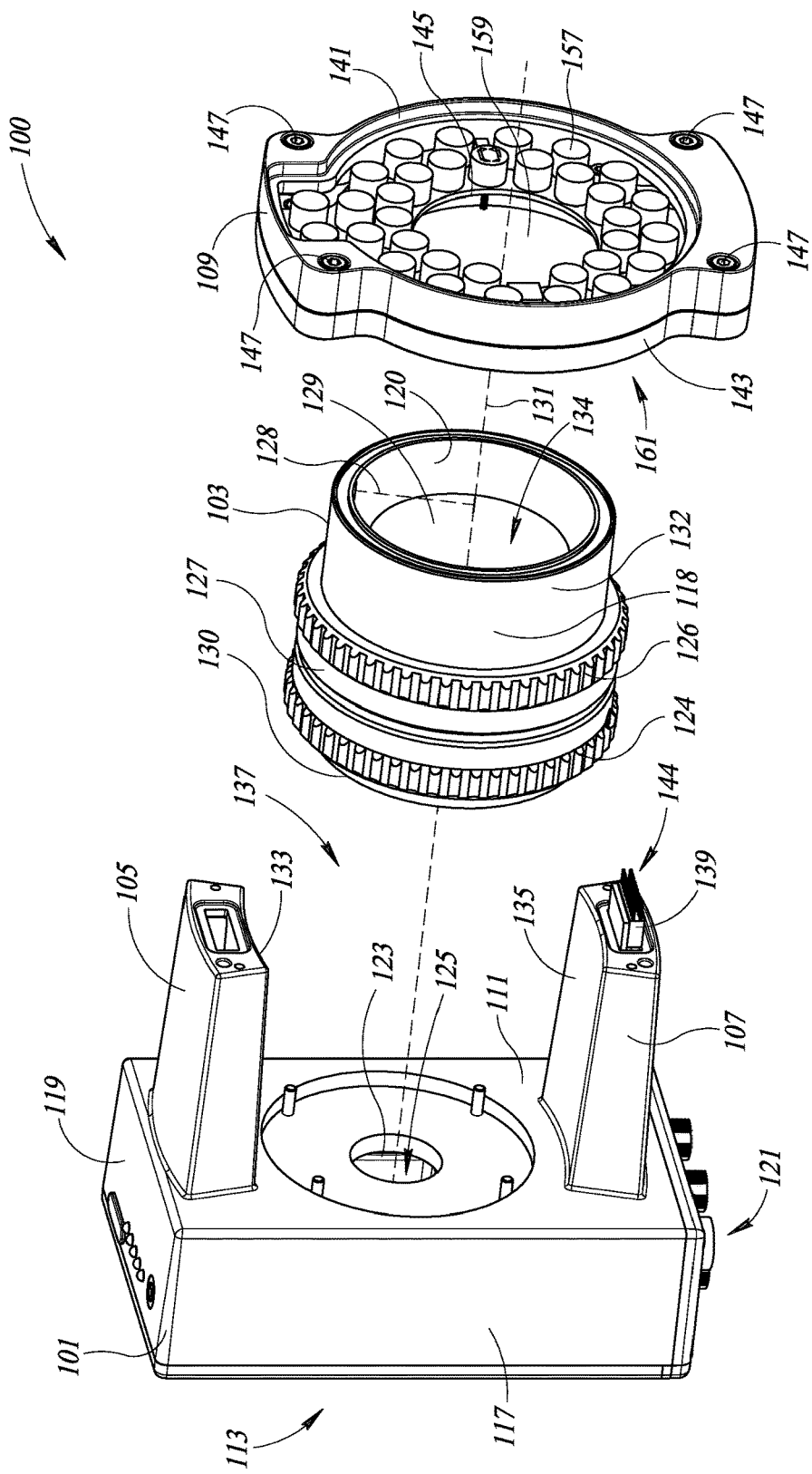
FIG. 2 is an exploded view of the imager of FIG. 1, according to at least one illustrated implementation.

FIGS. 1 and 2 show an imager 100 that may be used, for example, in an industrial setting to capture images of products or components within a field-of-view of the imager 100. The imager 100 may include a base 101, a lens assembly 103, a first arm 105, a second arm 107, and a light source assembly 109. The base 101 includes a front surface 111 and an opposing back surface 113 that are separated by a distance 115 and that at least partially delineate an interior cavity for the base 101. The base 101 may include one or more side walls 117, a top surface 119, and a bottom surface 121 that extends between the front surface 111 to the back surface 113. The front surface 111 of the base 101 may include an aperture 123 (FIG. 2), that may for example be positioned substantially in the center of the front surface 111. In some implementations, the interior cavity of the base 101 may enclose one or more photosensor arrays 125 (FIG. 2), such as, for example, photosensor arrays 125 (e.g., array of charge-coupled devices or CCDs) used to capture digital photo or video data.

The lens assembly 103 extends outward, forward from the front surface 111 of the base 101 towards the light source assembly 109. The lens assembly 103 may be positioned substantially in the center of the front surface 111 of the base 101. The lens assembly 103 may be substantially cylindrical in shape with a proximal end 130 (FIG. 2) located proximate the base 101 and a distal end 132 located proximate the light source assembly 109 when the imager is assembled with a central axis 131 (FIG. 2) running therebetween. An outer lens barrel 127 may extend around and delineate a radius 128 (FIG. 2) of the lens assembly 103. The outer lens barrel 127 may include an exterior surface 118 (FIG. 2) and an interior surface 120 (FIG. 2). The outer lens barrel 127 may be substantially hollow, and thus provide a passage 134 (FIG. 2) that runs along the central axis 131 between the proximal end 130 and the distal end 132 of the lens assembly 103. In some implementations, the outer lens barrel 127 may form a rim on the proximal end 130 of the lens assembly that lies in a plane that is perpendicular to the central axis 131. In some implementations, the outer lens barrel 127 may form a rim on the distal end 132 of the lens assembly that lies in a plane substantially perpendicular to the central axis 131.

The lens assembly 103 may include one or more lenses 129 (FIG. 2), such as those used to provide an optical path to capture light for photographic and/or video images. The lens(es) 129 may be mounted in the outer lens barrel 127, aligned with the passage 134 of the outer lens barrel 127. When the imager 100 is assembled, the lens(es) 129 may be centered over and substantially cover the aperture 123 in the front surface 111 of the base 101. The lens assembly 103 may include an external aperture ring 124 (FIG. 2) that may be used to vary an aperture setting of the lens(es) 129. In some implementations, the lens assembly 103 may include an external focus ring 126 (FIG. 2) that may be used to vary a focus setting of the lens(es) 129. The exterior surface 118 (FIG. 2) may include one or more markings 122 adjacent one or both of the external aperture ring 124 and the external focus ring 126 that correspond to specific aperture and focus settings, respectively, for the lens assembly 103. Such markings 122 may enable a user or operator of the imager 100 to advantageously modify and/or set the aperture and/or focus settings even when the imager 100 lacks power or otherwise cannot provide an immediate output of images.

The first arm 105 and the second arm 107 extend outward, forward from the front surface 111 of the base 101 towards the light source assembly 109. In some implementations, the first arm 105 and the second arm 107 may be mechanically coupled to the base 101 via, for example, screws or nuts and bolts. In some implementations, the first arm 105 and the second arm 107 may form a unitary body with at least the front surface 111 of the base 101. In some implementations, the first arm 105 and the second arm 107 may form a unitary body with one or more of the front surface 111, one or more side walls 117, the top surface 119, and the bottom surface 121 of the base 101. The first arm 105 and the second arm 107 may be separated from each other across a portion of the front surface 111 of the base 101, for example diametrically opposed to one another across the aperture 123. The first arm 105 may have a concave surface 133 that faces towards the second arm 107 and has a radius of curvature that is slightly larger than the radius 128 of the lens assembly 103. The second arm 107 may have a concave surface 135 that faces towards the first arm 105 and that has a radius curvature that is slightly larger than the radius 128 of the lens assembly 103. The first arm 105 and second arm 107 may form a gap 137 that is sized and shaped to receive the lens assembly between the concave surface 133 of the first arm 105 and the concave surface 135 of the second arm 107. The first arm 105 and the second arm 107 may thereby provide support, stability, and rigidity for the overall structure of the imager 100, while also providing access to at least a portion of the lens assembly 103, for instance from a lateral or circumferential side thereof. As discussed in more detail below, such access may be sufficient to allow an operator or user of the imager 100 to adjust one or more settings for the imager 100 via one or more controls located on the outside of the outer lens barrel 127.

In some implementations, either or both of the first arm 105 and the second arm 107 may include an internal conduit that may be traversed by one or more electrical wires, electrically conductive traces, optical fibers, or other connections to provide a signal path 144. The signal path 144 may be used, for example, to provide power and/or to transmit signals to the light source assembly 109. Such power and/or signals may be used to selectively power and control the components of the light source assembly 109 in order to facilitate the capture of photographic or video images of objects positioned in front of the light source assembly 109. At least one of the first arm 105 and the second arm 107 may include an electrical connector 139 that is arranged and positioned to electrically and/or communicatively couple with corresponding, complementary electrical connectors on the light source assembly 109 when the imager 100 is assembled.

The light source assembly 109 is positionable at the end of the first arm 105 and the second arm 107 opposite the base 101. The light source assembly 109 may include a substantially circular region 149 (FIG. 1) with a radius 151 (FIG. 1) that is larger than the radius 128 of the lens assembly 103. The light source assembly 109 may further include an upper tab 153 (FIG. 1) and a lower tab 155 (FIG. 1) that extend radially outward from the upper portion and the lower portion, respectively, of the circular region 149. At least one of the upper tab 153 and the lower tab 155 may include an electrical connector that complements and couples with the electrical connector 139 in the first arm 105 and/or second arm 107 when the imager 100 is assembled. Such electrical connector may be used, for example, to provide power and/or signals to the components of the light source assembly 109.

The light source assembly 109 may include a front piece 141 (FIG. 1) located on an outside portion of the imager 100, and an opposing back piece 143 (FIG. 1) located between the lens assembly 103 and the front piece 141. The front piece 141 and the back piece 143 of the light source assembly 109 may be physically coupled to each other using one or more securing or coupling features, for instance fasteners such as bolts and nuts, clips or screws 147. The front piece 141 of the light source assembly 109 may include an outer surface 145 (FIG. 2) comprised of, for example, glass, quartz, fluorite, acrylic plastics, or other materials that have desirable properties for passing through light to capture photographic or video images. The outer surface 145 may be set within a perimeter extending around the outer edge of the front piece 141 of the light source assembly 109. In some implementations, the outer surface 145 may be clamped between the front piece 141 and the back piece 143.

The back piece 143 of the light source assembly 109 may carry an array of light sources 157 that are positioned to emit light in an outward direction away from the imager 100. The light sources 157 may include, for example, a plurality of light emitting diodes (LEDs) mounted on a printed circuit board (PCB) that is mounted within the back piece 143 of the light source assembly 109. Such a PCB board may be electrically and/or communicatively coupled to the electrical connector 139 in the first arm 105 and/or second arm 107 and may thereby receive signals to control the operation of the array of light sources 157. The PCB may be secured to a back wall 161 of the back piece 143 of the light source assembly 109. The LEDs may be arranged in an annular array around an aperture 159 in the PCB. The back wall 161 may have a corresponding opening or aperture that is aligned with the aperture 159 in the PCB, thereby providing an optical path for light to traverse the light source assembly 109 from the outer surface 145 of the front piece 141 through the opening in the back piece 143.

The imager 100 may be assembled by physically coupling one or both of the first arm 105 and the second arm 107 to the light source assembly 109 (e.g., to a frame of the light source assembly 109), with the lens assembly 103 clamped therebetween. When such coupling occurs, the light source assembly 109 engages with the rim on the distal end 132 of the lens assembly 103 to thereby apply a force on the lens assembly 103 directed towards the base 101. The rim on the proximal end 130 of the lens assembly 103 thus engages with the base 101 to clamp the lens assembly 103 between the base 101 and the light source assembly 109. When the lens assembly 103 is so clamped, the portion of the outer lens barrel 127 located at the proximal end 130 of the lens assembly 103 may be disposed about and in contact with the front surface 111 of the base 101 about the periphery of the aperture 123, in a facing relationship therewith relative to the front surface 111 of the base 101, and the portion of the outer lens barrel 127 located at the distal end 132 of the lens assembly 103 may be disposed about and in contact with the back wall 161 of the light source assembly 109 about the periphery of the opening in the back wall 161, in a facing relationship relative to the back wall 161 of the light source assembly 109.

An O-ring, or some other flexible, resilient seal, may be placed where the outer lens barrel 127 engages either or both of the base 101 and the light source assembly 109 to form a hermetic seal therebetween. Such a hermetic seal may result, for example, in IP-65 protection. In some implementations, the resilient seal may be compressed between the outer lens barrel 127 and the base 101 at the proximal end 130 of the lens assembly 103. One or both of the outer lens barrel 127 and base 101 may include an annular trench, recess, slot, or depression sized and dimensioned to receive or partially receive such a resilient seal. In some implementations, a resilient seal may be at least partially compressed between the outer lens barrel 127 and the light source assembly 109 at the distal end 132 of the lens assembly 103. One or both of the outer lens barrel 127 and light source assembly 109 may likewise include an annular trench, recess, slot or depression sized and dimensioned to at least partially receive such a resilient seal.

In the assembled imager 100, the aperture 159 in the PCB may be optically aligned with a first end of the lens 129 mounted within the passage 134 of the outer lens barrel 127, and a second end of the lens 129 may be optically aligned with the aperture 123 located in the front surface 111 of the base 101. As such, the assembled imager 100 may provide an optical path from the aperture 159 of the PCB through the passage 134 and aperture 123 in the base 101 to the one or more photosensor arrays 125 located within the interior of the base 101. The one or more photosensor arrays 125 may thus have a field-of-view 163 that extends outwardly from the front surface 111 of the base 101, through the passage 134 in the lens assembly 103, and out of the aperture 159 in the light source assembly 109.

Figure 3:
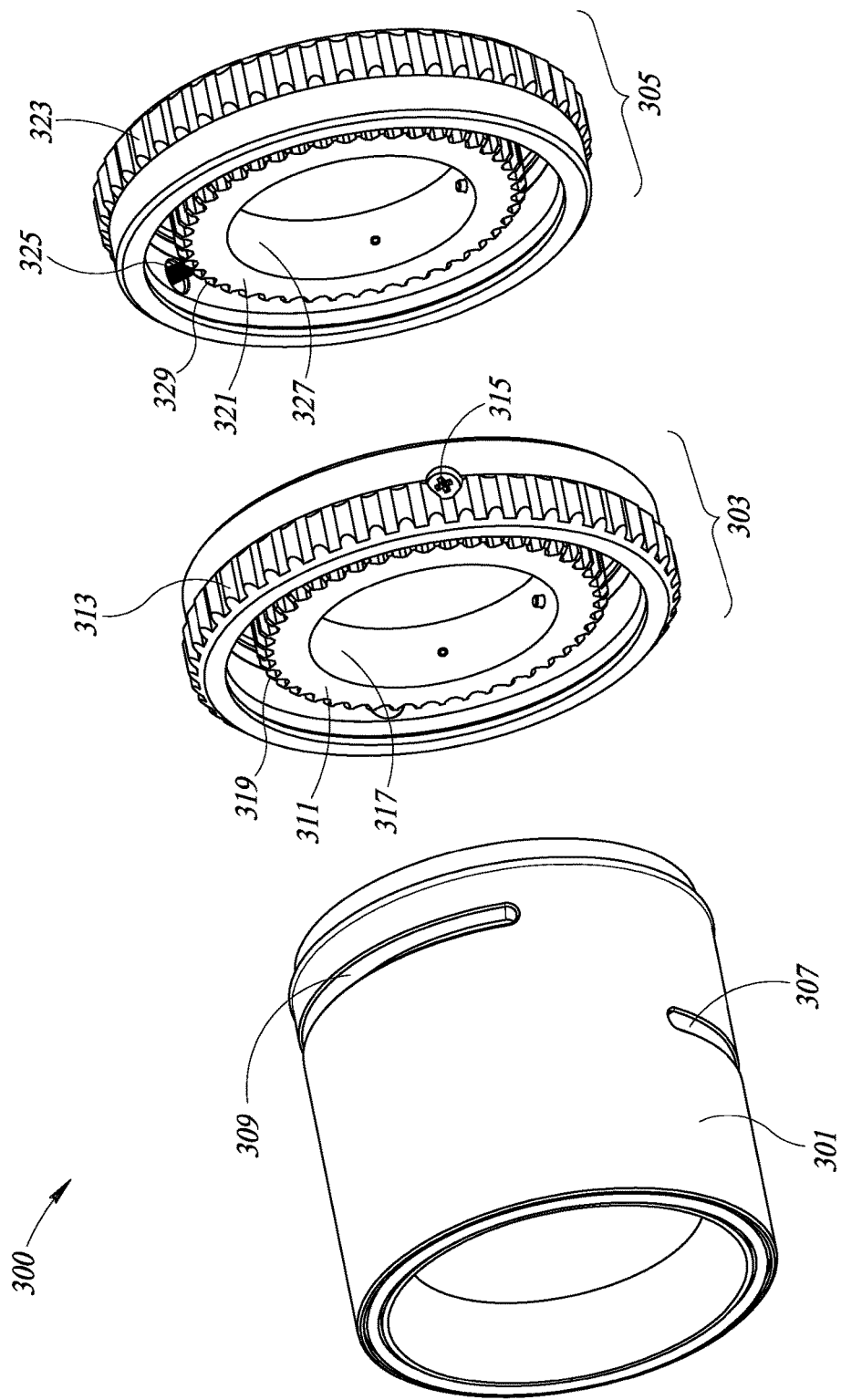
FIG. 3 is a an exploded view of a portion of an imager showing an outer lens barrel, an inner and outer ring to adjust an aperture setting, and an inner and outer ring to adjust a focus setting, according to at least one illustrated implementation.

FIG. 3 is an exploded view of a portion of an imager 300 that includes an outer lens barrel 301 and an accompanying focus ring assembly 303 and aperture ring assembly 305, according to one illustrated implementation. The outer lens barrel 301 may include a first slot 307 that extends circumferentially around at least a portion of the outer periphery or circumference of the outer lens barrel 301, and a second slot 309 that extends circumferentially around at least another portion of the outer periphery or circumference of the outer lens barrel 301. The first slot 307 may provide a passage from an exterior portion of the outer lens barrel 301 to an interior portion of the outer lens barrel 301.

The focus ring assembly 303 may include an internal focus ring 311, an external focus ring 313, and a first projection 315. The internal focus ring 311 may be annular in shape with an interior circumference 317 and an exterior circumference 319. The internal focus ring 311 may be sized and shaped such as to fit inside and be surrounded by the outer lens barrel 301. The interior periphery or circumference 317 may be sized and shaped to fit around the circumference of the lens 129. Adjusting the position of the internal focus ring 311 may result in the focus setting within the imager 300 bring adjusted. The internal focus ring 311 may be positioned within the outer lens barrel 301 radially in line with the first slot 307. The external focus ring 313 may be annular in shape, and sized and shaped to slide over the exterior of the outer lens barrel 301 to be positioned over the first slot 307. In some implementations, the first projection 315 may be inserted into and pass through the external focus ring 313 towards the outer lens barrel 301. The first projection 315 may pass through the first slot 307, and may physically engage with a complementary coupling feature on the internal focus ring 311. For example, in some implementations, the first projection 315 may be a screw that is threaded through the external focus ring 313, and directed towards a complementary coupling feature on the internal focus ring 311. In some implementations, the complementary coupling feature may be a recessed hole sized and shaped and threaded to receive the end of the screw being used as the first projection 315. In some implementations, the internal focus ring 311 may have one or more slots formed by a plurality of projections (e.g., teeth, such as those used for gears) that project outward from the outer surface of the internal focus ring 311. The first projection 315 may extend through the first slot 307 and be securely engaged within one of the slots on the internal focus ring 311 between at least two of the projections. In such a situation, moving the external focus ring 313 may result in a corresponding and direct movement of the internal focus ring 311.

The aperture ring assembly 305 may include an internal aperture ring 321, an external aperture ring 323, and a second projection 325. The internal focus ring 311 may be annular in shape with an interior periphery or circumference 327 and an exterior periphery or circumference 329. The internal aperture ring 321 may be sized and shaped such as to fit inside and be surrounded by the outer lens barrel 301. The interior periphery or circumference 327 may be sized and shaped to fit around the circumference of the lens 129. Adjusting the position of the about or encompass focus ring 311 may cause the aperture setting within the imager 300 to be adjusted. The internal aperture ring 321 may be positioned within the outer lens barrel 301 radially in line with the second slot 309. The external aperture ring 323 may be annular in shape, and sized and shaped to slide over the exterior of the outer lens barrel 301 to be positioned over the second slot 309. In some implementations, the second projection 325 may be inserted into and pass through the external aperture ring 323 towards the outer lens barrel 301. The second projection 325 may pass through the second slot 309, and may physically engage with a complementary coupling feature on the internal aperture ring 321. For example, in some implementations, the second projection 325 may be a screw that is threaded through the external aperture ring 323, and directed towards a complementary coupling feature on the internal aperture ring 321. In some implementations, the complementary coupling feature a recessed hole sized, shaped, and threaded to receive the end of the screw being used as the second projection 325. In some implementations, the internal aperture ring 321 may have one or more slots formed by a plurality of projections (e.g., teeth, such as those used for gears) that project outward from the outer surface of the internal aperture ring 321. The second projection 325 may extend through the second slot 309 and be securely engaged within one of the slots on the internal aperture ring 321 between at least two of the projections. In such a situation, moving the external aperture ring 323 may result in a corresponding and direct movement of the internal aperture ring 321.

In some implementations, a sleeve may be sized and shaped to fit over the exterior periphery or circumference of the outer lens barrel 301 to be positioned over the first slot 307. In such situations, the sleeve may cover the first slot 307 and include a small round hole that is just big enough for the first projection 315 to pass through towards the internal focus ring 311. Accordingly, such a sleeve may provide additional protection against the intrusion of water and/or of air-borne particles. In some implementations, the first projection 315 and/or the second projection 325 may pass through a flexible, compressible and/or resilient seal where the first projection 315 and/or the second projection 325 passes through the external focus ring 313 and/or the external aperture ring 323, respectively.

Figure 4:
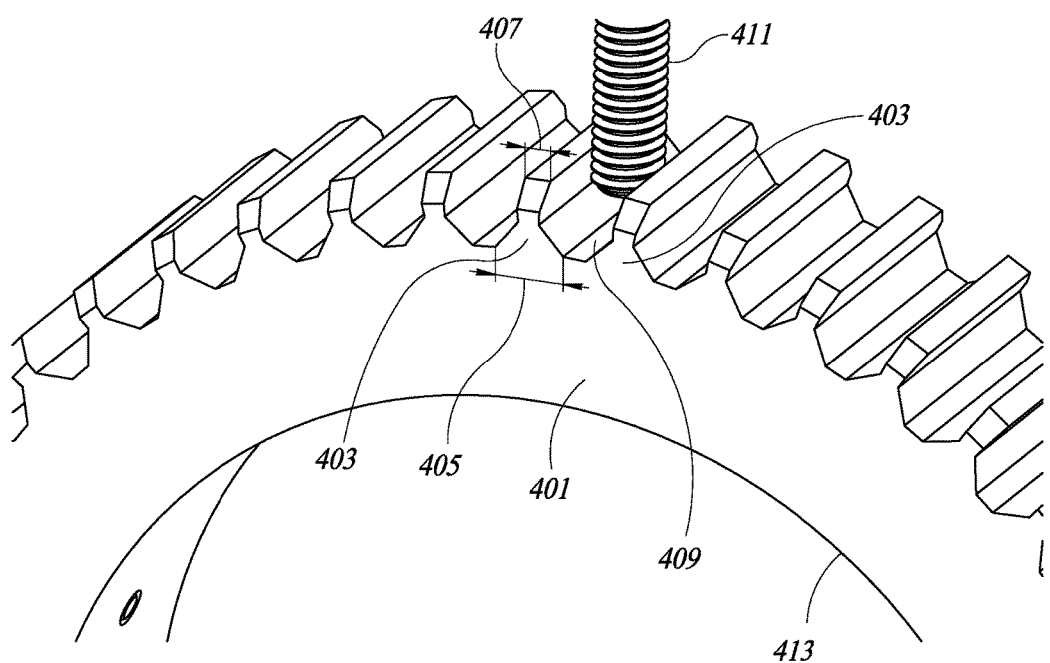
FIG. 4 is an isometric view of a part of an inner ring to adjust an aperture setting or a focus setting in which the inner ring has been physically coupled to a projection from an outer ring, according to at least one illustrated implementation.

FIG. 4 shows a coupling between an internal ring and an external ring, such as the internal and externals rings within the focus ring assembly 303 and the aperture ring assembly 305, according to at least one illustrated implementation. An internal ring 401 (e.g., the internal focus ring 311 or the internal aperture ring 321) may include multiple teeth or ridges 403 that extend radially outward from the internal ring 401. In some implementations, each tooth or ridge 403 may extend laterally across the exterior of the internal ring 401, perpendicular to a periphery or circumference of the internal ring 401. In some implementations, each tooth or ridge 403 may taper as it extends outward from the internal ring 401 such that a distance across a base 405 of the tooth or ridge 403 is greater than a distance across a tip 407 of the tooth or ridge 403.

Each pair of adjacent teeth or ridges 403 may form a coupling feature, such as a cavity or opening 409. Such an opening 409 may form a corresponding physical coupling feature to receive a coupling projection 411 projecting downward from an external ring (not depicted). The opening 409 may be tapered such that the distance between the two corresponding ridges 403 that form the opening 409 becomes smaller as the projection 411 progresses towards the inner periphery or circumference 413 of the internal ring 401. In some implementations, the distance between adjacent teeth or ridges 403 at the start of the opening 409 may be larger than a diameter of the projection 411 to facilitate the entry of the projection 411 into one of the slots 409 within the internal ring 401. As the projection 411 continues to be inserted into the opening 409, the tip of the projection 411 will engage with the two corresponding teeth or ridges 403 that form the opening 409 to secure the projection 411 to the internal ring 401, thereby coupling the outer ring with the internal ring 401.

Figure 5:
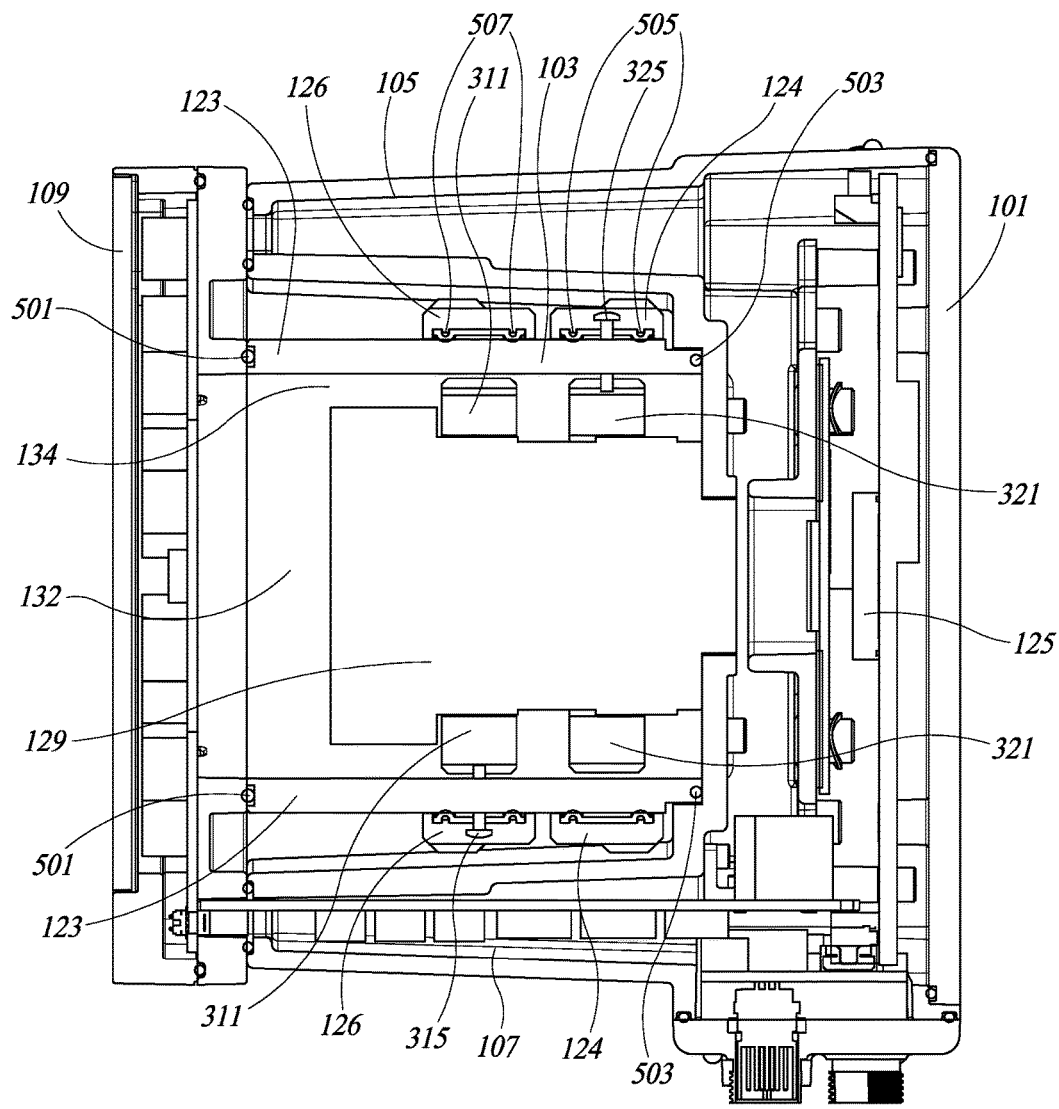
FIG. 5 is a cross sectional view along a length of an imager, including a base, lens assembly, two arms, and light source assembly, accordingly to at least one illustrated implementation.

FIG. 5 shows a cross-sectional view along a length of a light source assembly 109, lens assembly 103, and base 101, according to at least one illustrated implementation. The lens assembly 103 is clamped between the light source assembly 109 and the base 101 to form an optical path that extends through the lens 129, which is enclosed within a passage 134 formed by the interior of the outer lens barrel 127, towards the photosensor array 125 enclosed within the base 101. A first resilient seal 501 may be located at the distal end 132 of the lens assembly 103 to form a seal between the lens assembly 103 and the light source assembly 109 when the lens assembly 103 is clamped between the light source assembly 109 and the base 101, thereby compressing the first resilient seal 501. In some implementations, such a seal may be a hermetic seal that provides protection against the intrusion of water and/or if air-borne particles. In some implementations, such a hermetic seal may provide protection equivalent to IP-65 protection according to the International Protection Marking provided by the International Electrotechnical Commission (IEC) standard 60529. The first resilient seal 501 may be formed, for example, by an O-ring comprised of compressible, resilient material that does not allow water and/or air or air-borne particles to pass through when clamped, or otherwise compressed by, two opposing bodies. Such material may include, for example, rubber, synthetic materials (e.g., synthetic rubbers), elastomers, etc. In some implementations, one or both of the lens assembly 103 and the light source assembly 109 may include an annular channel, recess, slot, or depression, sized and dimensioned to accommodate a portion of the first resilient seal 501 to at least partially secure the first resilient seal 501 in place.

In some implementations, a second resilient seal 503 may be located at the proximal end 130 of the lens assembly 103 to form a seal between the lens assembly 103 and the base 101 when the lens assembly 103 is clamped between the light source assembly 109 and the base 101, thereby compressing the second resilient seal 503. In some implementations, such a seal may be a hermetic seal that provides protection against the intrusion of water and/or if air-borne particles. In some implementations, such a hermetic seal may provide protection equivalent to IP-65 protection according to the International Protection Marking provided by the International IEC standard 60529. The second resilient seal 503 may be formed, for example, by an O-ring comprised of compressible, resilient material that does not allow water and/or air or air-borne particles to pass through when clamped, or otherwise compressed by, two opposing bodies. Such material may include, for example, rubber, synthetic materials (e.g., synthetic rubbers), elastomers, etc. In some implementations, one or both of the lens assembly 103 and the base 101 may include an annular channel, recess, slot, or depression sized and dimensioned to accommodate a portion of the second resilient seal 503 to at least partially secure the second resilient seal 503 in place.

As previously discussed, the internal focus ring 311 may surround a portion of the lens 129 and be located between the lens 129 and the outer lens barrel 127. Rotating the internal focus ring 311 may result in changing the focus setting for the lens assembly 103. The external focus ring 126 may be located on the exterior periphery or circumference of the outer ring barrel 127. The external focus ring 126 may be directly, physically coupled to the internal focus ring 311 via the first projection 315. One or more flexible, compressible, resilient seals 505 may be located between, and compressed by, the external focus ring 126 and the outer lens barrel 127 to thereby form a seal, e.g., a hermetic seal, to protect the interior portion of the outer lens barrel 127 from intrusion by water and/or air-borne particles. The internal aperture ring 321 may surround a portion of the lens 129 and be located between the lens 129 and the outer lens barrel 127. Rotating the internal aperture ring 321 may result in changing the aperture setting for the lens assembly 103. The external aperture ring 124 may be located on the exterior periphery or circumference of the outer ring barrel 127. The external aperture ring 124 may be directly, physically coupled to the internal aperture ring via the second projection 325. One or more flexible, compressible, resilient seals 507 may be located between, and compressed by, the external aperture ring 124 and the outer lens barrel 127 to thereby form a seal, e.g., a hermetic seal, to protect the interior portion of the outer lens barrel 127 from intrusion by water and/or air-borne particles.

Figure 6:
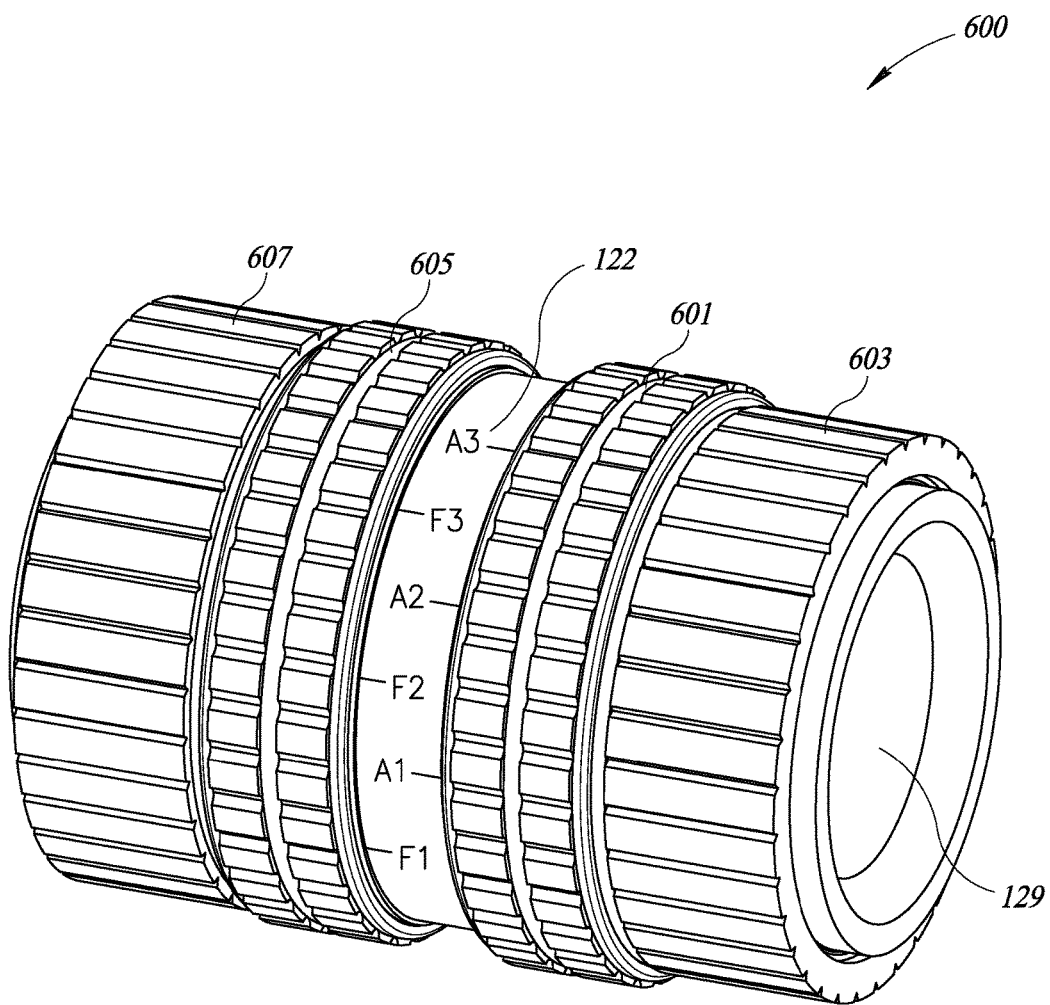
FIG. 6 is a side isometric view of the front, side of a lens assembly that includes an external focus ring and focus blocking ring, and an external aperture ring and an aperture blocking ring, according to at least one illustrated implementation.

FIG. 6 is side isometric view of a lens assembly 600 that includes an external aperture ring 601 and an associated aperture blocking ring 603, and an external focus ring 605 and an associated focus blocking ring 607, according to at least one illustrated implementation. The external aperture ring 601 may be directly, physically coupled to an internal aperture ring 321, which, as previously discussed, may be used to vary the aperture setting for an enclosed lens 129. The aperture blocking ring 603 may be used to lock the external aperture ring 601 in place. In some implementations, for example, the aperture blocking ring 603 may be physically attached to the lens assembly 600 using a set of screw threads (e.g., screw mount). In such an implementation, the aperture blocking ring 603 may be rotated in a first direction (e.g., counterclockwise) which may cause the aperture blocking ring 603 to move in a lateral direction away from the external aperture ring 601 into an unlocked position. When the aperture blocking ring 603 is in the unlocked position, the external aperture ring 601 may be manipulated, for example, by the user or operator, to vary the aperture setting on the lens assembly 600. The aperture blocking ring 603 may be rotated in a second, opposite direction (e.g., clockwise) to cause the aperture blocking ring 603 to move in a lateral direction towards the external aperture ring 601 into a locked position, thereby preventing the external aperture ring 601 from being moved. Providing a locked position to thereby prevent movement of the external aperture ring 601 may be advantageous, for example, in locations in which the imager 100 and lens assembly 600 may be subject to vibrations or sudden, jarring motions that might otherwise result in the aperture setting being unexpectedly modified or changed.

In some implementations, the external focus ring 605 may be directly, physically coupled to an internal focus ring 311, which, as previously discussed, may be used to vary the focus setting for an enclosed lens 129. The focus blocking ring 607 may be used to lock the external focus ring 605 in place. In some implementations, for example, the focus blocking ring 607 may be physically attached to the lens assembly 600 using a set of screw threads. In such an implementation, the focus blocking ring 607 may be rotated in a first direction (e.g., counterclockwise) which may cause the focus blocking ring 607 to move in a lateral direction away from the external focus ring 605 into an unlocked position. When the focus blocking ring 607 is in the unlocked position, the external focus ring 605 may be manipulated, for example, by the user or operator, to vary the focus setting on the lens assembly 600. The focus blocking ring 607 may be rotated in a second, opposite direction (e.g., clockwise) to cause the focus blocking ring 607 to move in a lateral direction towards the external focus ring 605 into a locked position, thereby preventing the external focus ring 605 from being moved. Providing a locked position to thereby prevent movement of the external focus ring 605 may be advantageous, for example, in locations in which the imager 100 and lens assembly 600 may be subject to vibrations or sudden, jarring motions that might otherwise result in the focus setting being unexpectedly modified or changed.

In some implementations, the aperture blocking ring 603 may function independently from the focus blocking ring 607, such that unlocking the aperture blocking ring 603 has no effect on the external focus ring 605. Similarly, unlocking the focus blocking ring 607 may have no effect on the external aperture ring 601.

Figure 7:
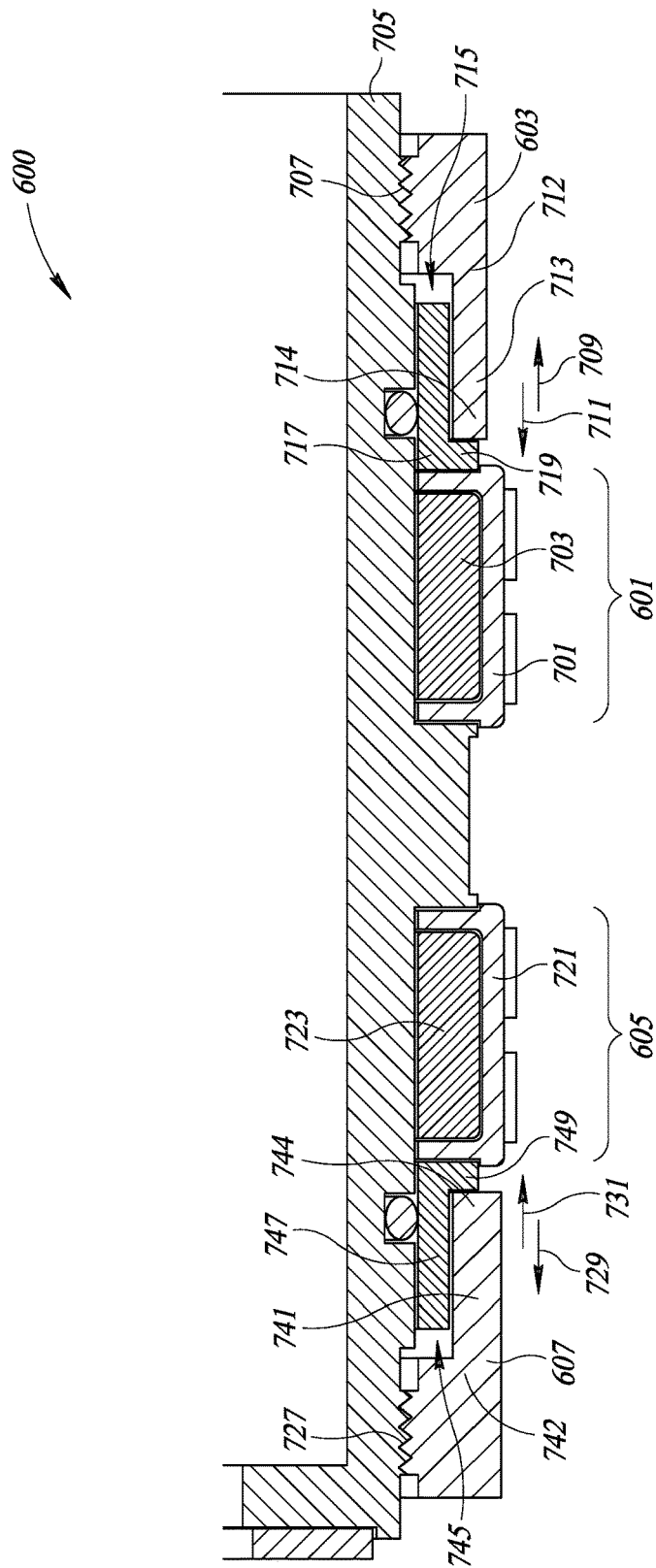
FIG. 7 is a cross-sectional view of a bottom portion of the lens assembly shown in FIG. 6.

FIG. 7 is a cross-sectional view of a bottom half of a length of the lens assembly 600 shown in FIG. 6. In some implementations, the external aperture ring 601 may include a flexible outer cover 701 that extends over a rigid core 703. The flexible outer cover 701 may be used for one or more of a variety of purposes, e.g., to provide a user or operator with a better grip to manipulate the external aperture ring 601, to provide protection for the external aperture ring 601 from wear and tear, to serve as part of a hermetic seal in a lateral direction across the length of an outer lens barrel 705 and lens assembly 600, etc. The flexible outer cover 701 may be comprised, for example, of rubber, elastomers, or other suitable materials. The rigid core 703 may be comprised, for example, of a plastic, polycarbonate, or fiberglass material, of an aluminum alloy, or any other suitable material. The aperture blocking ring 603 may be physically coupled to the outer lens barrel 705 of the lens assembly 600 using a set of screw threads 707. In such an implementation, the aperture blocking ring 603 may be rotated in a first direction to cause the aperture blocking ring 603 to move axially away 709 from the external aperture ring 601 into an unlocked position. The aperture blocking ring 603 may be rotated in a second, opposite direction to cause the aperture blocking ring 603 to move axially towards 711 the external aperture ring 601 into a locked position in which the aperture blocking ring 603 engages and prevents movement of the external aperture ring 601.

In some implementations, the aperture blocking ring 603 may include a lateral portion 713 that extends laterally towards the external aperture ring 601. The lateral portion 713 may be connected to the remaining part of the aperture blocking ring 603 at a proximal end 712 and may end in a distal end 714 that is located relatively towards the external aperture ring 601. The lateral portion 713 may be separated from the outer lens barrel 705 to create a gap 715 between the outer lens barrel 705 and the lateral portion 713 of the aperture blocking ring 603. In some implementations, a locking ring 717 may extend around the circumference of the outer lens barrel 705 and occupy at least a portion of the gap 715 between the lateral portion 713 of the aperture blocking ring 603 and the outer lens barrel 705. The locking ring 717 may be comprised of rigid material (e.g., plastic, metal, polycarbonate, etc.) and may be used to lock the external aperture ring 601 in position when the aperture blocking ring 603 is in a locked position. The locking ring 717 may include a flanged portion 719 that extends radially outward from the outer lens barrel 705 between the distal end 714 of the lateral portion 713 of the aperture blocking ring 603 and the external aperture ring 601. In such an implementation, when the aperture blocking ring 603 is being moved into the locked position, the aperture blocking ring 603 will move axially towards and engage the flanged portion 719 of the locking ring 717, which will result in the locking ring 717 moving axially towards and engaging the external aperture ring 601. The locking ring 717, including the flanged portion 719, may thereby lock the position of the external aperture ring 601 in a desired setting. In some implementations, the locking ring 717 may only move in an axial direction without rotating to prevent the setting on the external aperture ring 601 from being disturbed. When the aperture blocking ring 603 is moved into the locked position, the flanged portion 719 of the locking ring 717 may engage and compress the flexible outer cover 701 of the external aperture ring 601 to form a seal therebetween. In some implementations, such a seal may provide protection against intrusion by water and/or by air-borne particles, thereby forming a hermetic seal. In some implementations, such a hermetic seal may provide protection equivalent to IP-65 protection according to the International Protection Marking provided by the IEC standard 60529.

In some implementations, the external focus ring 605 may include a flexible outer cover 721 that extends over a rigid core 723. The flexible outer cover 721 may be used for one or more of a variety of purposes, e.g., to provide a user or operator with a better grip to manipulate the external focus ring 605, to provide protection for the external focus ring 605 from wear and tear, to serve as part of a hermetic seal in a lateral direction across the length of an outer lens barrel 705 and the lens assembly 600, etc. The flexible outer cover 721 may be comprised, for example, of rubber, elastomers, or other suitable materials. The rigid core 723 may be comprised, for example, of a plastic, polycarbonate, or fiberglass material, of an aluminum alloy, or any other suitable material. The focus blocking ring 607 may be physically coupled to the outer lens barrel 705 of the lens assembly 600 using a set of screw threads 727. In such an implementation, the focus blocking ring 607 may be rotated in a first direction to cause the focus blocking ring 607 to move axially away 729 from the external focus ring 605 into an unlocked position. The focus blocking ring 607 may be rotated in a second, opposite direction to cause the focus blocking ring 607 to move axially towards 731 the external focus ring 605 into a locked position in which the focus blocking ring 607 engages and prevents movement of the external focus ring 605.

In some implementations, the focus blocking ring 607 may include a lateral portion 741 that extends laterally towards the external focus ring 605. The lateral portion 741 may be connected to the remaining part of the focus blocking ring 607 at a proximal end 742 and may end in a distal end 744 that is located relatively towards the external focus ring 605. The lateral portion 741 may be separated from the outer lens barrel 705 to create a gap 745 between the outer lens barrel 705 and the lateral portion 741 of the focus blocking ring 607. In some implementations, a locking ring 747 may extend around the circumference of the outer lens barrel 705 and occupy at least a portion of the gap 745 between the lateral portion 741 of the focus blocking ring 607 and the outer lens barrel 705. The locking ring 747 may be comprised of rigid material (e.g., plastic, metal, polycarbonate, etc.) and may be used to lock the external aperture ring 605 in position when the focus blocking ring 607 is in a locked position. The locking ring 747 may include a flanged portion 749 that extends radially outward from the outer lens barrel 705 between the distal end 744 of the lateral portion 741 of the focus blocking ring 607 and the external focus ring 605. In such an implementation, when the focus blocking ring 607 is being moved into the locked position, the focus blocking ring 607 will move axially towards and engage the flanged portion 749 of the locking ring 747, which will result in the locking ring 747 moving axially towards and engaging the external focus ring 605. The locking ring 747, including the flanged portion 749, may thereby lock the position of the external focus ring 605 in a desired setting. In some implementations, the locking ring 747 may only move in an axial direction without rotating to prevent the setting on the external aperture ring 601 from being disturbed. When the focus blocking ring 607 is moved into the locked position, the flanged portion 749 of the locking ring 747 may engage and compress the flexible outer cover 721 of the external focus ring 605 to form a seal therebetween. In some implementations, such a seal may provide protection against intrusion by water and/or by air-borne particles, thereby forming a hermetic seal. In some implementations, such a hermetic seal may provide protection equivalent to IP-65 protection according to the International Protection Marking provided by the IEC standard 60529.

Figure 8:
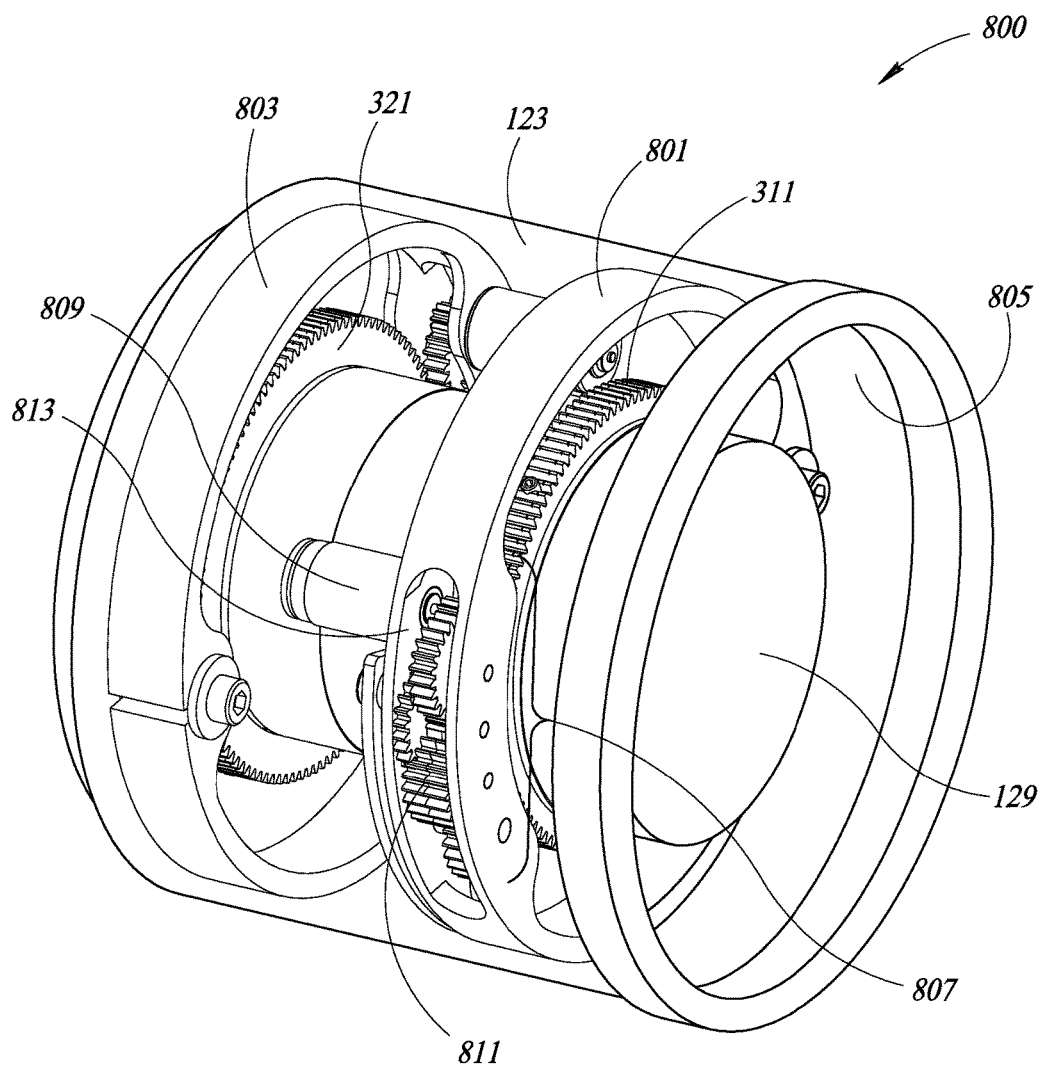
FIG. 8 is an isometric view of a lens assembly in which the outer lens barrel is illustrated as partly transparent to show an enclosed focus modular drive and an enclosed aperture modular drive, according to at least one illustrated implementation.
Figure 9:
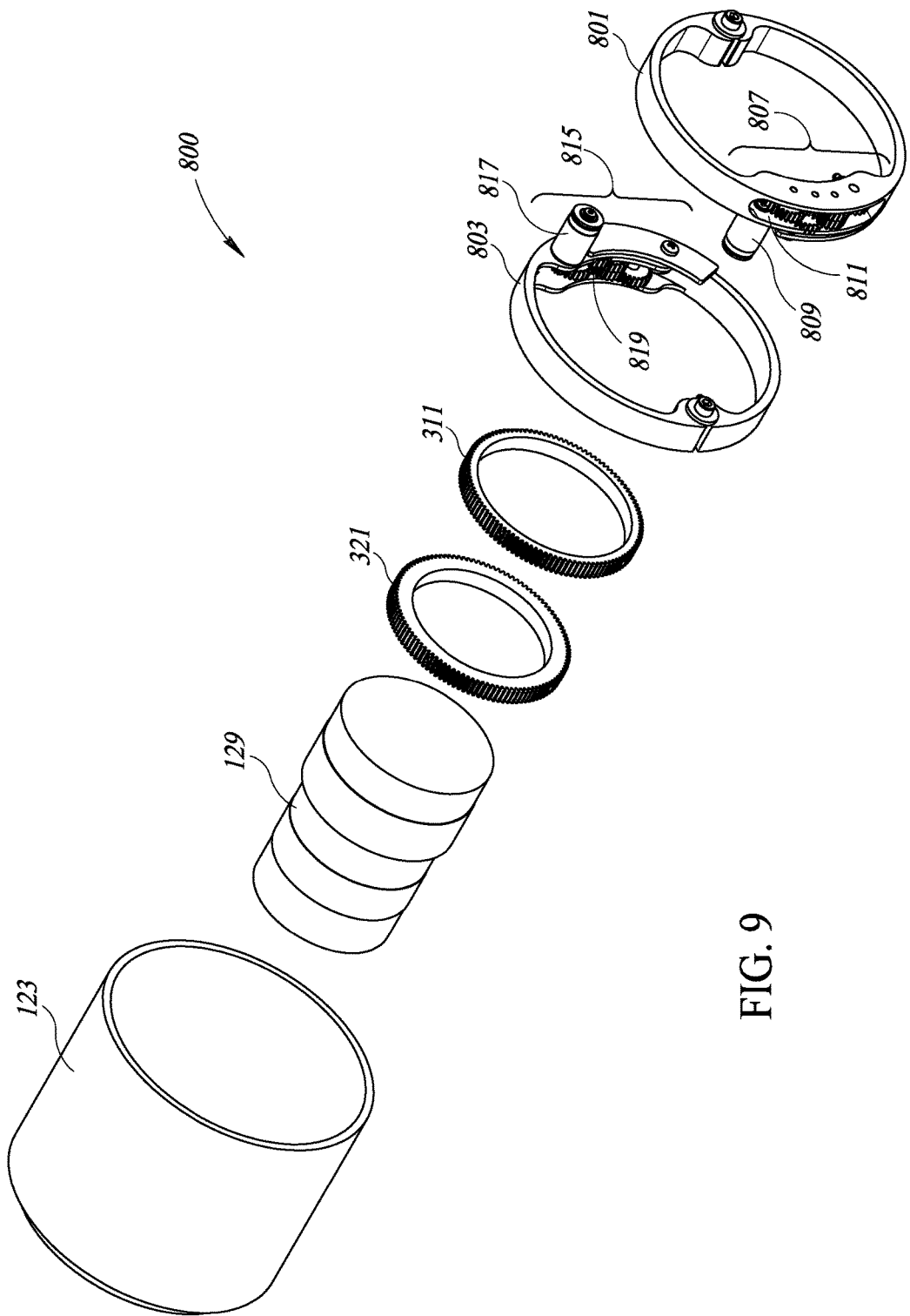
FIG. 9 is an exploded isometric view showing the components of the lens assembly shown in FIG. 8.

FIG. 8 shows a lens assembly 800 in which the outer lens barrel 127 has been illustrated as semi-transparent to better show a number of internal structures. It should be noted that although the outer lens barrel 127 is shown as semi-transparent, any type of suitable material, including fully opaque or fully transparent materials, may be used for the outer lens barrel 127. The lens assembly 800 includes a lens 129, an internal focus ring 311, a focus modular drive 801, an internal aperture ring 321, and an aperture modular drive 803. FIG. 9 is an exploded isometric view of the components of the lens assembly 800, according to at least one illustrated implementation.

The focus modular drive 801 may have an annular shape, located radially outward from the internal focus ring 311, between the internal focus ring 311 and the outer lens barrel 127. The focus modular drive 801 may be located adjacent to and flush with an interior wall 805 of the outer lens barrel 127. In some implementations, the focus modular drive 801 may be physically coupled with the outer lens barrel 127 to secure the focus modular drive 801 into place. In some implementations, the focus modular drive 801 may be secured and held in place via static forces, such as a frictional force between the focus modular drive 801 and the interior wall of the outer lens barrel 127. The focus modular drive 801 includes a motorized drive portion 807 that includes a motor 809 (FIG. 8) and one or more gears 811. At least one of the gears 811 may be drivingly engaged and coupled to the slots 409 on the outer circumference of the internal focus ring 311. In such a situation, the internal focus ring 311 may be rotated, and the focus setting changed, by actuating the motor 809 to drive the one or more gears 811 on the focus modular drive 801.

The motor 809 and/or the one or more gears 811 may be mounted on a printed circuit board 813. Power may be provided to the printed circuit board 813 through one or more wires, for example, such as wires that traverse the interior or exterior of the outer lens barrel 127. In some implementations, the printed circuit board 813 may be powered inductively via an inductive coupling transferred through, for example, the outer lens barrel 127. The motor 809 may be, for example, a stepper motor, a DC motor, or any other appropriate motor 809 that can be sized and shaped to be attached to the focus modular drive 801. The motor 809 may be used to drive a set of one or more gears 811 that provide a step-down or reduction ratio to drive the internal focus ring 311. In some implementations, for example, the one or more gears 811 may provide a 500-1 gear reduction to facilitate rotating the internal focus ring 311.

The aperture modular drive 803 may have an annular shape that is located radially outward from the internal aperture ring 321, between the internal aperture ring 321 and the outer lens barrel 127. The aperture modular drive 803 may be located adjacent to and flush with an interior wall 805 of the outer lens barrel 127. In some implementations, the aperture modular drive 803 may be physically coupled with the outer lens barrel 127 to secure aperture modular drive 803 into place. In some implementations, the aperture modular drive 803 may be secured and held in place via static forces, such as a frictional force between the aperture modular drive 803 and the interior wall of the outer lens barrel 127. The aperture modular drive 803 includes a motorized drive portion 815 that includes a motor 817 (FIG. 9) and one or more gears 819. At least one of the gears 819 may be drivingly engaged and coupled to the slots 409 on the outer circumference of the internal aperture ring 321. In such a situation, the internal aperture ring 321 may be rotated, and the aperture setting changed, by actuating the motor 817 to drive the one or more gears 819 on the aperture modular drive 803.

The motor 817 and/or the one or more gears 819 may be mounted on a printed circuit board 821. Power may be provided to the printed circuit board 821 through one or more wires, for example, such as wires that traverse the interior or exterior of the outer lens barrel 127. In some implementations, the printed circuit board 821 may be powered inductively via an inductive coupling transferred through, for example, the outer lens barrel 127. The motor 817 may be, for example, a stepper motor, a DC motor, or any other appropriate motor 817 that can be sized and shaped to be attached to the aperture modular drive 803. The motor 817 may be used to drive a set of one or more gears 819 that provide a step-down or reduction ratio to drive the internal aperture ring 321. In some implementations, for example, the one or more gears 819 may provide a 500-1 gear reduction to facilitate rotating the internal aperture ring 321.

Figure 10:
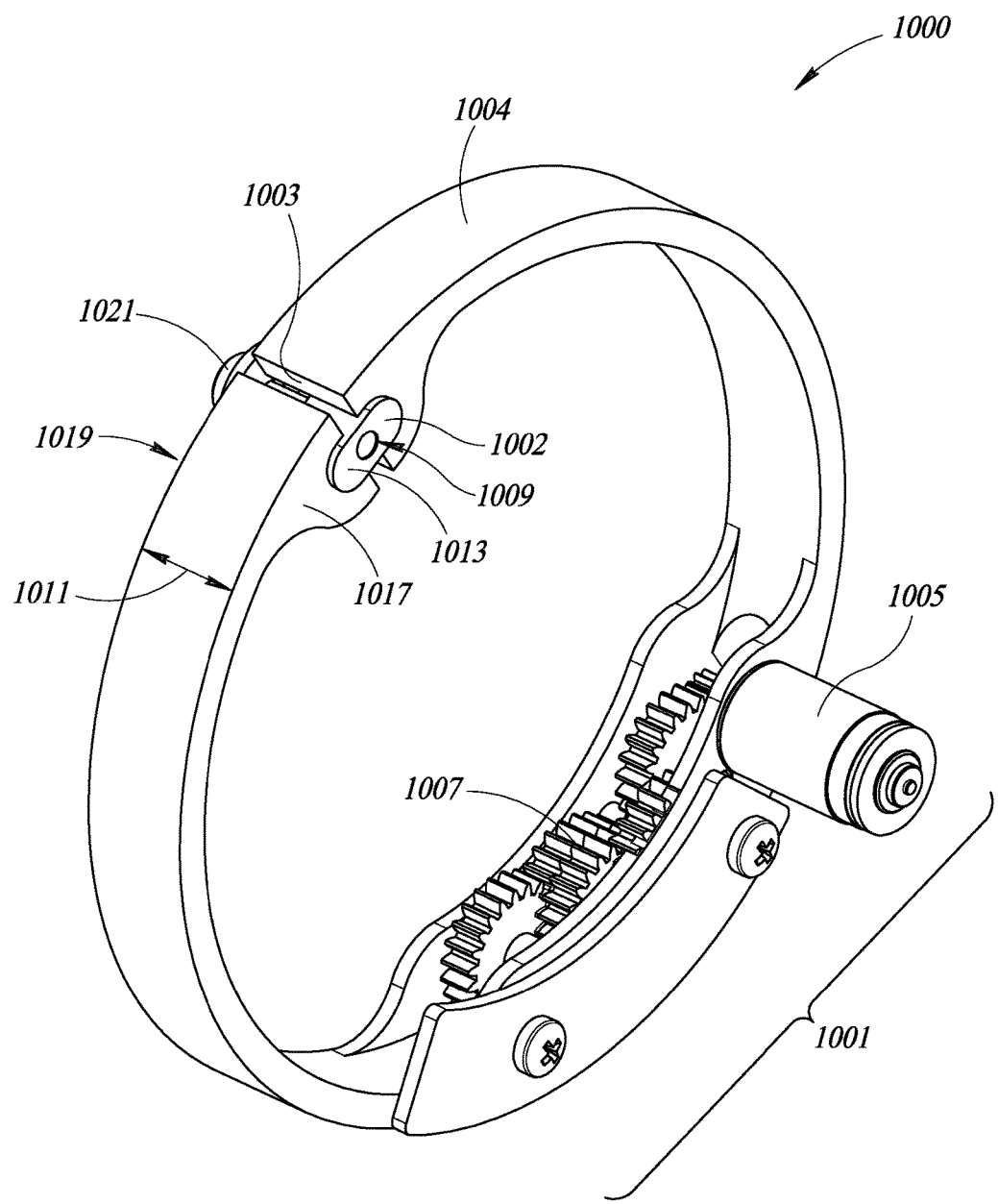
FIG. 10 is an isometric view of a modular drive unit, according to at least one illustrated implementation.

FIG. 10 shows a modular drive unit 1000, such as a focus modular drive 801 or an aperture modular drive 803, according to one illustrated implementation. The modular drive unit 1000 may be substantially cylindrical in shape with a first side 1017 and the opposing second side 1019 connected by an exterior wall 1004. The exterior wall 1004 may have a width 1011 and may delineate an outer circumference of the modular drive unit 1000. The modular drive unit 1000 may include a motorized drive portion 1001 and an expansion slot 1003. The motorized drive portion 1001 (e.g., the focus modular drive 801 and/or the aperture modular drive 803) may include a motor 1005 and one or more coupling components 1007, such as the gears, that are driven by the motor 1005 as discussed above. The expansion slot 1003 may be used to expand the circumference of the modular drive unit 1000 so that the exterior wall 1004 of the modular drive unit 1000 may engage and be flush with the interior wall 805 of the outer lens barrel 127. As such, the modular drive unit 1000 may be held in position within the passage 134 of the outer lens barrel 127 by frictional forces between the modular drive unit 1000 and the outer lens barrel 127.

The expansion slot 1003 may extend across the width 1011 of the modular drive unit 1000, creating a discontinuity 1002 or break in the modular drive unit 1000 that runs laterally and axially through the modular drive unit 1000. The discontinuity 1002 enables the circumference of the modular drive unit 1000 to be varied by expanding or contracting the distance between the two opposing sides of the discontinuity 1002 as needed. In some implementations, the expansion slot 1003 may have a bias towards a closed state in which the two opposing sides of the discontinuity 1002 are touching. The expansion slot 1003 may be expanded by pushing the two opposing sides of the discontinuity 1002 apart, thereby resulting in an increased circumference for the modular drive unit 1000. In some implementations, the expansion slot 1003 may include a cavity 1009 that is open to the first side 1017 of the modular drive unit 1000, and a channel that traverses the remaining width 1011 of the modular drive unit 1000 from the cavity 1009 to the second, opposing side 1019 of the modular drive unit 1000. In such implementations, the diameter of the channel may be less than the diameter of the cavity 1009.

In some implementations, a deformable wedge 1013 is sized and shaped to be drawn into the cavity 1009 to thereby expand the cavity 1009 and, thus, vary the distance between the two opposing sides of the discontinuity 1002, and to thereby vary the circumference of the modular drive unit 1000. The deformable wedge 1013 may have a proximal end closest to the cavity 1009 and a distal end furthest from the cavity 1009. In some implementations, the proximal end and the distal end of the deformable wedge 1013 may be shaped similarly to the shape of the opening of the cavity 1009. In some implementations, a proximal of the deformable wedge 1013 may be slightly smaller than the size of the opening to the cavity 1009 to facilitate entry of the deformable wedge 1013 into the cavity 1009. In such an implementation, the cross sectional area of the deformable wedge 1013 may increase in size from the proximal end to the distal end such that the distal end of the deformable wedge 1013 may be larger than the opening to the cavity 1009. Accordingly, as the deformable wedge 1013 is drawn into the cavity 1009, the deformable wedge 1013 increase the size of the cavity 1009 pushing the two opposing sides of the discontinuity 1002 further apart.

The deformable wedge 1013 may be drawn into the cavity 1009 through a projection 1021 that extends from the second side 1019 of the modular drive unit 1000 through to the cavity 1009 to couple with the deformable wedge 1013. In some implementations, for example, the projection 1021 may be a screw that includes a threaded portion that extends through to the cavity 1009. The deformable wedge 1013 may have a corresponding threaded cavity that is sized and shaped to receive the threaded portion of the screw. As such, tightening the screw results in drawing the deformable wedge 1013 further into the cavity 1009, thereby increasing the size of the cavity 1009 and increasing the circumference of the modular drive unit 1000. Loosening the screw may result in pushing the deformable wedge 1013 out of the cavity 1009, thereby resulting in the cavity 1009, and the circumference of the modular drive unit 1000, getting smaller as the two opposing sides of the cavity 1009 move towards a closed position.

Figure 11:
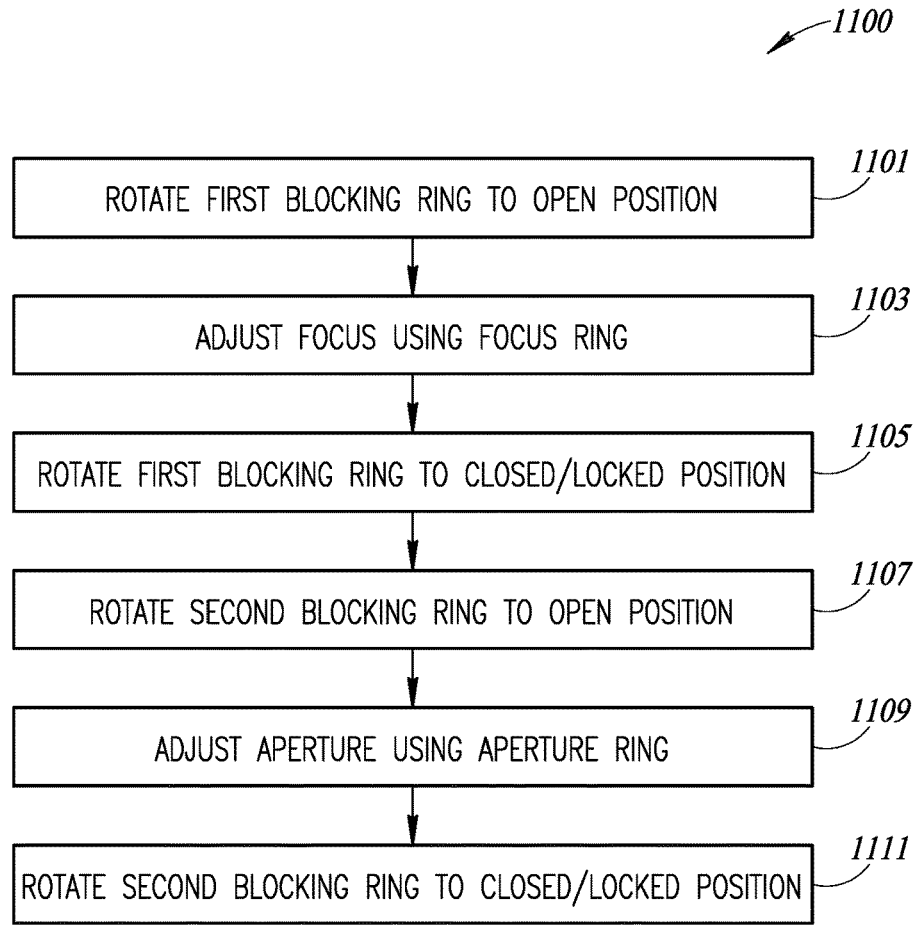
FIG. 11 is a flow diagram that illustrates adjusting the focus and/or aperture settings for a lens assembly, and locking a focus blocking ring and/or an aperture blocking ring, according to at least one illustrated implementation.

FIG. 11 shows a method 1100 for modifying a focus setting and an aperture setting on an imager 100 that includes a focus blocking ring 607 and associated external focus ring 605, and an aperture blocking ring 603 and associated external aperture ring 601, according to at least one illustrated implementation.

At 1101, the focus blocking ring 607 is rotated in a first direction to an unlocked position.

At 1103, the external focus ring 605 is rotated to adjust the focus setting for the lens 129.

At 1105, the focus blocking ring 607 is rotated in a second, opposite direction to a locked position.

At 1107, the aperture blocking ring 603 is rotated in a first direction to an unlocked position.

At 1109, the external aperture ring 601 is rotated to adjust the aperture setting for the lens 129.

At 1111, the aperture blocking ring 603 is rotated in a second, opposite direction to a locked position. Method 1100 ends at 1111.

Figure 12:
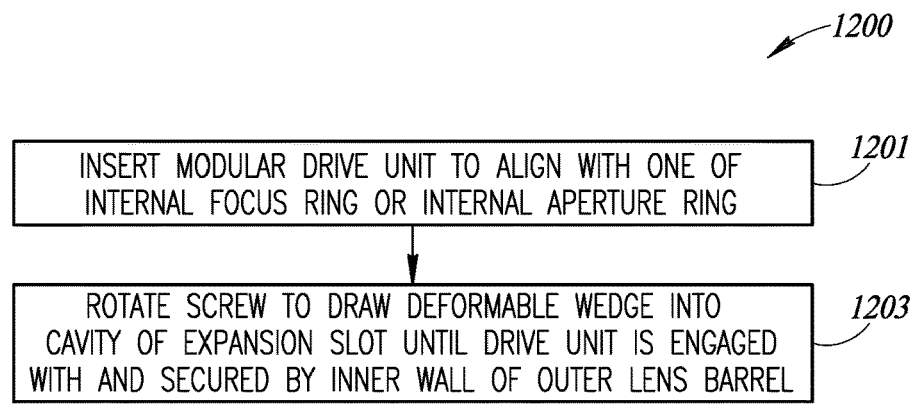
FIG. 12 is a flow diagram that illustrates inserting and setting a modular drive unit, according to at least one illustrated implementation.

FIG. 12 shows a method 1200 for positioning and locking a modular drive unit 1000 to be physically coupled to one of an internal focus ring 311 and an internal aperture ring 321, according to at least one illustrated implementation.

At 1201, the modular drive unit 1000 is inserted into the interior of the outer lens barrel 127. In some implementations, the modular drive unit 1000 may be inserted into the passage 134 such that a plane formed by the first side 1017 of the modular drive unit 1000 is perpendicular to the central axis 131 of the outer lens barrel 127 until the coupling component 1007 of the modular drive unit 1000 is aligned to be physically coupled with either of the internal focus ring 311 or the internal aperture ring 321. In some implementations, the modular drive unit 1000 may be inserted using an insertion tool that may be shaped like a cylinder that may be used to push the modular drive unit 1000 to keep the first side 1017 perpendicular to the central axis 131. In some implementations, the insertion tool may have one or more notches cut into it to account, for example, for the motor 809/817 and/or the motorized drive portion 1001.

At 1203, the projection 1021 (e.g., the screw) may be rotated to thereby draw the deformable wedge 1013 into the cavity 1009 of the modular drive unit 1000, thereby expanding the outer circumference of the modular drive unit 1000 until the exterior wall 1004 of the modular drive unit 1000 is physically engaged with the interior wall 805 of the outer lens barrel 127. Method 1200 ends at 1203.

The foregoing detailed description has set forth various implementations of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one implementation, the present subject matter may be implemented via Application Specific Integrated Circuits (ASICs). However, those skilled in the art will recognize that the implementations disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative implementation applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. An imager, comprising:
 a base having a front;
 a lens assembly that comprises:
  an outer lens barrel having a passage, a first end, and a second end, the second end opposed across a length of the outer lens barrel from the first end, the passage extends between the first and the second ends;
  at least one lens mounted in the outer lens barrel aligned with the passage;
  a first external ring located external to the outer lens barrel;
  a first internal ring located within the outer lens barrel and configured to engage with the first external ring to vary a first setting on the at least one lens; and
  a first resilient seal located between the first external ring and the first internal ring;
 at least one arm that extends forwardly from the base;
 at least one signal path that extends along the at least one arm;
 a light source assembly that comprises an array of light sources and an aperture therethrough, the light source assembly positioned outwardly of the first end of the outer lens barrel with the aperture aligned with the passage of the outer lens barrel, physically coupled to the at least one arm to thereby clamp the outer lens barrel between the base and the light source assembly and communicatively coupled to the at least one signal path when the outer lens barrel is clamped; and
 an array of photosensors having a field-of-view that extends outwardly of the front of the base, through the passage of the outer lens barrel and the aperture of the light source assembly when the outer lens barrel is clamped to the base.

2. The imager of claim 1, wherein the base has a front wall and a back wall that at least partially form an interior portion of the base, the base which includes an aperture located on the front wall, the aperture aligned with the passage in the lens assembly when the outer lens barrel is clamped between the based and the light source assembly.

3. The imager of claim 1, wherein the upper arm includes a concave lower surface, and a lower arm that extends outward from the front wall of the base, the lower arm which includes a concave upper surface located opposite the concave lower surface of the upper arm separated by a distance to form a cavity, and wherein the outer lens barrel is positioned within the cavity when the outer lens barrel is clamped between the base and the light source assembly.

4. The imager of claim 1, wherein the lens assembly further comprises:
 a second external ring located external to the outer lens barrel;
 a second internal ring located within the outer lens barrel and configured to engage with the second external ring to vary a second setting on the at least one lens; and
 a second resilient seal located between the second external ring and the second internal ring.

5. The imager of claim 4, wherein the first setting is an aperture setting, and the second lens setting is a focus setting.

6. The imager of claim 1, wherein the lens assembly further comprises a projection extending from the first external ring through an aperture in the outer lens barrel to engage with the first internal ring.

7. The imager of claim 1, wherein the first seal is located between, and compressed by, the first external ring and the outer lens barrel.

8. An imager, comprising:
 a base having a front;
 a lens assembly that comprises an outer lens barrel and at least one lens, the outer lens barrel having a passage, a first end, and a second end, the second end opposed across a length of the outer lens barrel from the first end, the passage extends between the first and the second ends, and the at least one lens mounted in the outer lens barrel aligned with the passage;
 at least one arm that extends forwardly from the base;
 at least one signal path that extends along the at least one arm;
 a light source assembly that comprises an array of light sources and an aperture therethrough, the light source assembly positioned outwardly of the first end of the outer lens barrel with the aperture aligned with the passage of the outer lens barrel, physically coupled to the at least one arm to thereby clamp the outer lens barrel between the base and the light source assembly and communicatively coupled to the at least one signal path when the outer lens barrel is clamped;
 an array of photosensors having a field-of-view that extends outwardly of the front of the base, through the passage of the outer lens barrel and the aperture of the light source assembly when the outer lens barrel is clamped to the base;
 a first resilient seal positioned between the first end of the outer lens barrel and the light source assembly to form a hermetical seal therebetween when the outer lens barrel is clamped between the light house assembly and the base; and
 a second resilient seal positioned between the second end of the outer lens barrel and the base to form a hermetical seal therebetween when the outer lens barrel is clamped between the light source assembly and the base.

9. The imager of claim 8, wherein the lens assembly further comprises an internal aperture ring to vary an aperture setting on the at least one lens, and an internal focus ring to vary a focus setting on the at least one lens.

10. The imager of claim 9, wherein the outer lens barrel includes a first slot and a second slot, the imager further comprising:
- an external aperture ring positioned over an exterior surface of the outer lens barrel opposite the internal aperture ring, the external aperture ring physically coupled to the internal aperture ring via a first projection that passes through the first slot;
- a first blocking ring attached to the exterior surface of the outer lens barrel adjacent the external aperture ring, the first blocking ring to rotate radially around the exterior surface of the outer lens barrel from an open position that allows movement of the external aperture ring to vary the aperture setting of the at least one lens to a closed position that locks the exterior aperture ring;
- an external focus ring positioned over the exterior surface of the outer lens barrel opposite the internal focus ring, the external focus ring physically coupled to the internal focus ring via a second projection that passes through the second slot; and
- a second blocking ring attached the exterior surface of the outer lens barrel adjacent the external focus ring, the second blocking ring to rotate radially around the exterior surface of the outer lens barrel from an open position that allows movement of the external focus ring to vary the focus setting of the at least one lens to a closed position that locks the external focus ring.

11. The imager of claim 10, wherein the first blocking ring includes a first lateral portion that extends towards the external aperture ring and is separated from the outer lens barrel to form a first gap, and wherein the second blocking ring includes a second lateral portion that extends towards the external focus ring and is separated from the outer lens barrel to form a second gap, the imager further comprising:
- a first locking ring positioned within the first gap between the outer lens barrel and the external aperture ring, the first locking ring to include a first flange that extends radially outward from the outer lens barrel between the first blocking ring and the external aperture ring, the first flange to lock a setting of the external aperture ring when the first blocking ring is in the closed position; and
- a second locking ring positioned within the second gap between the outer lens barrel and the external focus ring, the second locking ring to include a second flange that extends radially outward from the outer lens barrel between the second blocking ring and the exterior focus ring, the second flange to lock a setting of the external focus ring when the second blocking ring is in the closed position.

12. The imager of claim 10, wherein at least one of the first projection and the second projection is a screw that physically couples to a set of teeth that project radially outward from at least one of the internal aperture ring and the internal focus ring.

13. The imager of claim 10, wherein the outer lens barrel includes one or more markings that correspond to one or more focus or aperture settings.

14. The imager of claim 10, wherein the upper arm includes a concave lower surface, and a lower arm that extends outward from the front wall of the base, the lower arm which includes a concave upper surface located opposite the concave lower surface of the upper arm separated by a distance to form a cavity, wherein the outer lens barrel is positioned within the cavity when the outer lens barrel is clamped between the base and the light source assembly, and wherein the distance between the upper arm and the lower arm is sufficient to enable a user to manipulate each of the first blocking ring, the external aperture ring, the external focus ring, and the second blocking ring without decoupling the lens assembly from the base.

15. The imager of claim 9, wherein the outer lens barrel includes an interior surface, the imager further comprising:
- an aperture modular drive unit positioned between the internal surface of the outer lens barrel and the internal aperture ring, the aperture modular drive unit which includes a motor and one or more gears, at least one of which gears physically engages the internal aperture ring to vary the aperture setting.

16. The imager of claim 15, wherein the aperture modular drive unit has a first side and an opposing second side that extend partially radially inward from the interior surface of the outer lens barrel, wherein the aperture modular drive unit further has an exterior circumference, and wherein the aperture modular drive unit further comprises:
- an expansion slot that extends through the aperture modular drive unit from the first side to the second side, and forms a cavity facing the first side of the aperture modular drive unit;
- a deformable wedge that extends into the cavity on the first side of the aperture modular drive unit; and
- a projection that is physically coupled to the deformable wedge and extends from the second side of the aperture modular drive unit into the expansion slot, the projection to variably position the deformable wedge within the cavity to thereby control an expansion of the exterior circumference of the aperture modular drive unit.

17. The imager of claim 16, wherein the projection is a screw with screw threads, and wherein the screw is physically coupled to the deformable wedge via the screw threads to variably position the deformable wedge within the cavity of the expansion slot in the aperture modular drive unit.

18. An imager, comprising:
- a base having a front;
- a lens assembly that comprises:
    - an outer lens barrel having a passage, a first end, and a second end, the second end opposed across a length of the outer lens barrel from the first end, the passage extends between the first and the second ends;
    - at least one lens mounted in the outer lens barrel aligned with the passage; and
    - an internal focus ring to vary a focus setting on the at least one lens;
    - a focus modular drive unit positioned between the outer lens barrel and the internal focus ring, the focus modular drive unit which includes a motor and one or more gears; and
    - at least one of which gears physically engages the focus ring to vary the focus setting;
- at least one arm that extends forwardly from the base;
- at least one signal path that extends along the at least one arm;
- a light source assembly that comprises an array of light sources and an aperture therethrough, the light source assembly positioned outwardly of the first end of the outer lens barrel with the aperture aligned with the passage of the outer lens barrel, physically coupled to the at least one arm to thereby clamp the outer lens barrel between the base and the light source assembly and communicatively coupled to the at least one signal path when the outer lens barrel is clamped; and
- an array of photosensors having a field-of-view that extends outwardly of the front of the base, through the passage of the outer lens barrel and the aperture of the light source assembly when the outer lens barrel is clamped to the base.

19. The imager of claim 18, wherein the focus modular drive unit has a first side and an opposing second side that extend partially radially inward from the interior surface of the outer lens barrel, wherein the focus modular drive unit further has an exterior circumference, the focus modular drive unit further including:

an expansion slot that extends through the focus modular drive unit from the first side to the second side, and forms a cavity facing the first side of the focus modular drive unit;

a deformable wedge that extends into the cavity on the first side of the focus modular drive unit; and a projection that is physically coupled to the deformable wedge and extends from the second side of the focus modular drive unit into the expansion slot, the projection to variably position the deformable wedge within the cavity to thereby control an expansion of the exterior circumference of the focus modular drive unit.

20. The imager of claim 19, wherein the projection is a screw with screw threads, and wherein the screw is physically coupled to the deformable wedge via the screw threads to variably position the deformable wedge within the cavity of the expansion slot in the focus modular drive unit.

* * * * *